United States Patent Office 3,102,785
Patented Sept. 3, 1963

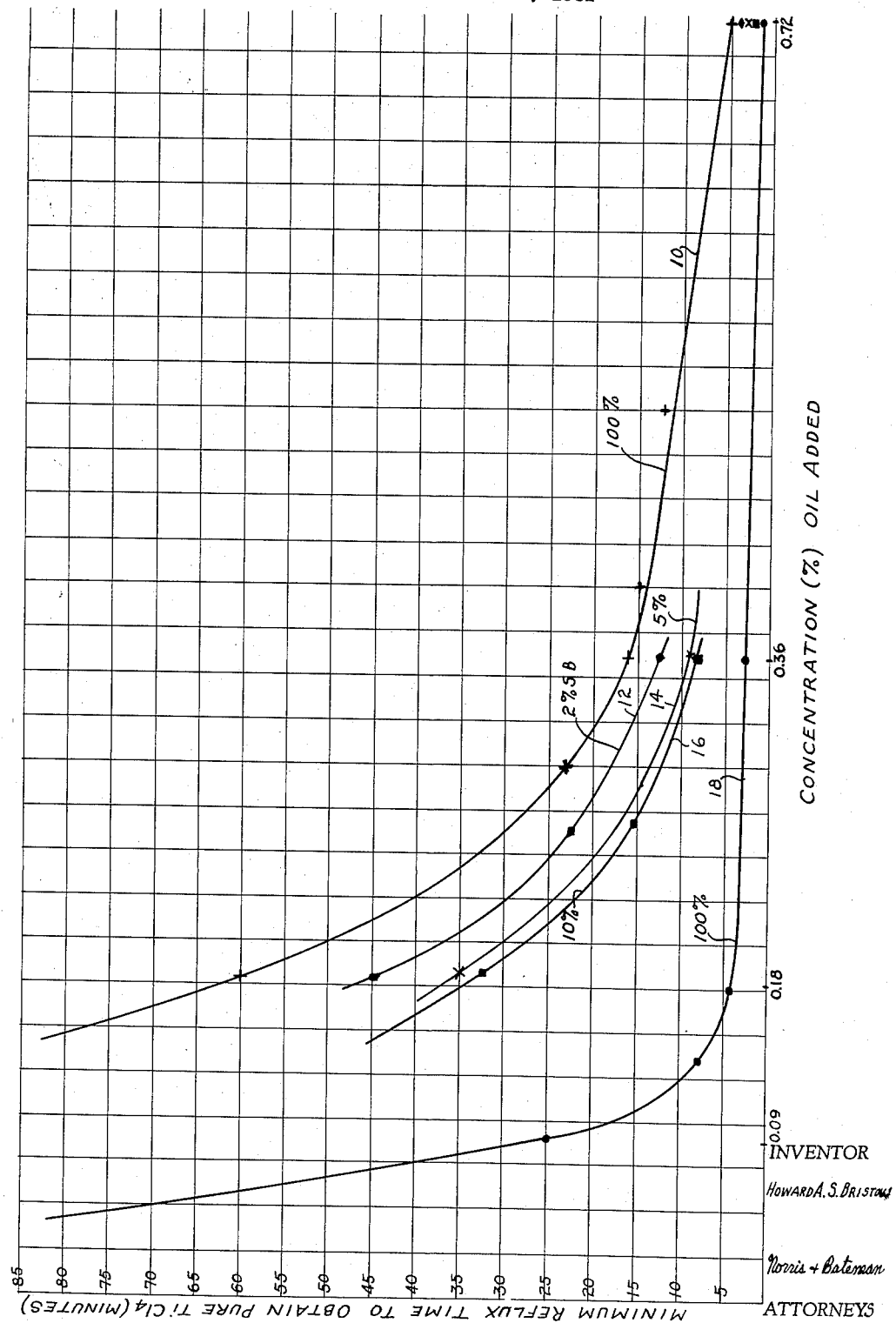

3,102,785
PROCESS FOR THE PURIFICATION OF
TITANIUM TETRACHLORIDE
Howard Arthur Stanley Bristow, Newbury, England, assignor to Laporte Titanium Limited, London, England, a British company
Filed Mar. 24, 1961, Ser. No. 98,138
Claims priority, application Great Britain Sept. 21, 1956
7 Claims. (Cl. 23—87)

The present invention relates to a method of purifying titanium tetrachloride and is particularly concerned with the removal of impurities such as vanadium, chromium and iron from impure titanium tetrachloride without causing discoloration of the final purified product.

This application is a continuation-in-part of applicant's abandoned application Serial No. 685,085, filed September 20, 1957.

In the past, it has been the custom to utilize certain organic materials in the purification of liquid titanium tetrachloride. The organic materials used are those which are capable of undergoing carbonization, probably preceded by polymerization, in the presence of the titanium tetrachloride under the conditions used, for example, when the impure titanium tetrachloride and the organic material are heated at or above the boiling point of titanium tetrachloride. The impurities such as vanadium and, when present, certain other metallic impurities, for example, iron and chromium, are taken up by the solid products of carbonization, and are removed by separating the solid carbonization products from the liquid titanium tetrachloride, for example, by distilling off the tetrachloride or by filtration or centrifuging.

Some organic materials carbonize more readily than other organic materials and the rate of carbonization is normally determined by the iodine value of the material. Slowly carbonizable organic materials are considered hereinafter to be those materials having an iodine value not exceeding approximately 25. Readily carbonizable organic materials are considered hereinafter to be materials having an iodine value exceeding approximately 80. The iodine values referred to herein are those determined by the iodine monochloride method described in the British Pharmacopaeia, 1953, pages 754-755.

Among the organic materials which carbonize slowly are saturated aliphatic hydrocarbons, such as liquid paraffin, which are found to be satisfactory as purifying agents only at temperatures above the boiling point of titanium tetrachloride or if a mixture of liquid titanium tetrachloride and the organic material is boiled under reflux for several hours.

When readily carbonizable materials containing unsaturated hydrocarbons are used, the refluxing time to produce the same degree of purification as compared to that attained with slowly carbonizable materials is appreciably reduced thereby advantageously reducing the overall treatment time required for purification.

However, the use of readily carbonizable materials is not without its shortcomings. Readily carbonizable materials, such as soya bean oil and cottonseed oil as disclosed in U.S. Letters Patent No. 2,592,021, while having a greater purifying power than slowly carbonizable materials (such as crude petroleum oil and certain mineral oils) are appreciably more expensive in comparison to the cost of the slowly carbonizable materials with the result that the use of such readily carbonizable materials often is economically prohibitive.

Another principal disadvantage of readily carbonizable materials, such as cottonseed oil and soya bean oil, is that they promote contamination of the purified product with organic substances which, upon distillation, produce a dark discoloration. For many uses of titanium tetrachloride, as for example, the manufacture of titanium metal, such discoloration is undesirable and is particularly prohibitive when the appearance of the purified product is required to have consumer appeal. As a consequence, it has been necessary, in the past, to use slowly carbonizable materials in the purification of certain products in order to obtain a product which is clear or to produce a product which was not economically prohibitive.

The present invention provides, as one of its principal objects, an improvement in the purifying power of the less costly slowly carbonizable materials in order to permit the production of a clear purified product within a reduced time period of treatment. This is accomplished, in accordance with the present invention, by providing for a purification process of titanium tetrachloride containing vanadium as an impurity, wherein the impure titanium tetrachloride is heated to a temperature of at least 100° C. with a small proportion of a mixture which consists essentially of at least one carbonizable saturated or unsaturated organic material having an iodine value not exceeding 25 and at least one carbonizable unsaturated organic material which has an iodine value of at least 80, and the total quantity of the carbonizable unsaturated organic material of an iodine value of at least 80 amounting to 2–20 percent calculated on the weight of the mixture. The purified titanium tetrachloride is then separated from the solid carbonization products containing the impurities.

More particularly, the present invention is a process for the purification of titanium tetrachloride containing vanadium as a metallic impurity wherein the impure titanium tetrachloride is heated to a temperature of at least 100° C. with a small specified proportion of a mixture of a mineral oil having an iodine value not exceeding 25 and an organic material selected from the group consisting of vegetable and animal oils having an iodine value of at least 80, the latter organic material being present in a quantity amounting to 2 to 20 percent calculated on the weight of the mixture thereof with the mineral oil. After purification takes place, the purified titanium tetrachloride then is separated from the solid carbonization products.

With the foregoing process, the purification power of the mixture of mineral oil with the animal or vegetable oil is appreciably increased in comparison with the use of only a slowly carbonizable material.

By using a mixture which contains substantially 2–20 percent of the oil having an iodine value at least 80, it was discovered that unexpected results were achieved in that the purifying effect of the mixture is super-additive rather than being additive as will presently be explained in detail. Thus, the use of the mixture enables the purification to be carried out in a given time with a smaller quantity of carbonizable material or to be carried out with a given quantity of carbonizable material in a shorter time.

The process according to the present invention further substantially eliminates contamination of the product with organic matter leading to discoloration of the purified product upon distillation while, at the same time, permitting the use of the more efficient readily carbonizable materials having iodine values of at least 80.

The proportion of the mixture of organic materials used varies depending on the content of impurities in the titanium tetrachloride, and on other conditions such as the period and temperature of the treatment. Thus, the greater the content of impurities, or the shorter the period or lower the temperature of the treatment, the larger is the proportion of the mixture of organic materials required. However, the proportion of the mixture should not be so large as to cause subsequent darkening of the color of the product as referred to above, if such darkening is undesirable. Generally speaking a proportion of the mixture amounting to 0.2–1.0 percent, and advantageously about 0.4 percent, calculated on the weight of the impure titanium tetrachloride is satisfactory.

As slowly carbonizable materials, that is to say, saturated or unsaturated organic materials having an iodine value not exceeding 25, mineral oils are advantageously used, such as crude petroleum oil or petroleum distillates, which are saturated or have a content of unsaturated compounds such that the iodine value does not exceed 25. Such mineral oils are, in general, apperciably less expensive than animal or vegetable oils and do not cause discoloration of the purified product. Alternatively, there may be used carbonizable vegetable or animal oils having the aforesaid degree of unsaturation if cost or color are not controlling factors. However, any known carbonizable mineral oil having an iodine value not exceeding 25 is preferred and is operative. Of the presently known slowly carbonizable materials with the aforesaid degree of saturation, none is known to applicant which would tend to interfere with the purification of the titanium tetrachloride. It is understood that such carbonizable materials, if existent, are excluded from the invention and are not included within the group of materials hereinbefore referred to as slowly carbonizable materials.

As the more readily carbonizable organic materials there may be used unsaturated oils, fats or waxes having an iodine value of at least 80, and preferably not exceeding 230. Especially useful and preferred are the unsaturated animal oils and vegetable oils having an iodine value of at least 80, such as linseed oil, cottonseed oil, castor oil and particularly soya bean oil. Such vegetable and animal oils used in this invention are any of those which have iodine values of at least 80. Examples of other suitable animal and vegetable oils are almond oil, cod liver oil, corn oil, olive oil, peanut oil, rapeseed oil, sperm oil and whale oil. Of the presently known readily carbonizable unsaturated organic materials within the aforesaid range of iodine values, any may be used and none are known to applicant which tend to interfere with the purification of the titanium tetrachloride. However, it is understood that such readily carbonizable materials, if existent, are not included in the group of materials hereinbefore referred to as readily carbonizable materials.

The mixture of the two kinds of organic materials defined above may contain one or more of the slowly carbonizable materials (such as mineral oils) and one or more of the more readily carbonizable materials (animal and vegetable oils), provided that the total quantity of the latter materials amounts to 2–20 percent on the weight of the mixture.

The heating of the impure titanium tetrachloride with the mixture of carbonizable materials may be carried out under atmospheric pressure of a higher or lower pressure, the titanium tetrachloride being in the liquid or vapor phase. Advantageously, the titanium tetrachloride is heated in the liquid state with the organic mixture under atmospheric pressure at a temperature within the range of 100° C. up to the boiling temperature of titanium tetrachloride, viz. 136° C. A convenient method is to boil the titanium tetrachloride under reflux in the presence of the organic mixture.

In addition to vanadium, the process of this invention also removes certain other metallic impurities, for example, iron and chromium, when present in the impure titanium tetrachloride. The process is very suitable for purifying titanium tetrachloride which is to be used for the manufacture of titanium dioxide, titanium metal and organic compounds of titanium, or which is to be used as a catalyst in various polymerization processes.

The following examples illustrate the invention, the parts being by weight:

EXAMPLE 1

100 parts of impure titanium tetrachloride containing 0.052 percent of vanadium (calculated as $V_2O_5$) were heated at the boil under reflux with a mixture of 0.38 part of the mineral lubricating oil having an iodine value of 12, and known in commerce as "Vitrea 69," and 0.02 part of soya bean oil having an iodine value of 147. The quantity of vanadium present in the titanium tetrachloride vapor was measured at intervals, and after refluxing for 8½ minutes vanadium could no longer be detected in the vapor. The purified titanium tetrachloride was then separated from the solid carbonized material by distillation, and the distilled titanium tetrachloride contained less than $2.5 \times 10^{-5}$ percent of vanadium (calculated as $V_2O_5$).

The procedure described above was repeated, but with the use of 0.4 part of the aforesaid lubricating oil, instead of the 0.4 part of the mixture thereof with soya bean oil. In this case it was necessary to reflux the titanium tetrachloride for 16½ minutes to obtain the same degree of purification. When 0.02 part of soya bean oil alone was used, the aforesaid degree of purification was not reached after refluxing for 4 hours.

The treatment of the above example was repeated with one half of the above quantities of the carbonizable materials, that is to say, with 0.19 part of the lubricating oil and 0.01 part of the soya bean oil. The same degree of purification was attained after refluxing for 15 minutes. When 0.19 part of the lubricating oil was used alone, it was necessary to reflux for about 65 minutes to attain the same degree of purification.

"Vitrea 69" is one of a series of lubricating mineral oils produced by the Shell International Petroleum Company Limited. It is a highly refined straight petroleum oil fraction having a flash point of 430° F., a specific gravity of 0.884 at 60° F., a pour point of 20° F. and a viscosity of 1800 on the Redwood scale at 70° F.

It is clear that the purifying power of a given quantity of the mixture of organic materials (i.e., a mineral oil having an iodine value not exceeding 25 and an animal or vegetable oil having an iodine value of at least 80) used in the process of this invention is greater than the purifying power of the same quantity of the slowly carbonizable material used alone.

Moreover, it has been discovered that the effectiveness of the mixture of organic materials according to the present invention is not additive but rather is super-additive, since the purifying power of the more readily carbonizable material, when used alone in the quantity in which it is present in the mixture, is appreciably lower than would be expected from the summation of the purifying powers of the various component oils of the mixture.

In considering the unexpected super-additive effect which the mixture has according to the present invention, for any given mixture of X parts of mineral oil (having an iodine value not exceeding 25) and Y parts of vegetable or animal oil (having an iodine value of at least 80), the quantity of the vegetable or animal oil which has the same purifying power as X parts of mineral oil can be readily ascertained. Assuming that Z parts of vegetable or animal oil is found to have the same purifying power as X parts of mineral, the foregoing can be expressed in the following mathematical form:

In the mixture:

$X$ parts of mineral oil $+ Y$ parts of vegetable oil $= P_1$

Taking the mineral oil and vegetable or animal oil alone:

$Z$ parts of vegetable oil $= P_2 = X$ parts of mineral oil where $P_1$ and $P_2$ represent different magnitudes of purifying power as expressed, for example, in terms of the time required for a given concentration of the particular oil or mixture of oils to purify the titanium tetrachloride to a given degree of purity.

If the purifying powers of the individual component oils of the mixture of organic materials according to the present invention were only additive, then, since $Z$ parts of vegetable oil has the same purifying power, $P_2$, as $X$ parts of mineral oil, the purifying power of $Y$ parts of vegetable or animal plus $Z$ parts of vegetable or animal oil should be the same as the total purifying power $P_1$ which was obtained from the mixture of $Y$ parts of animal or vegetable oil plus $X$ parts of mineral oil. Conversely, if $W$ parts of mineral oil is found to have the same purifying power as $Y$ parts of the vegetable or animal oil, then the purifying powers of $W$ parts of mineral oil plus $X$ parts of mineral oil should aggregate to the power $P_1$ which is the same as that total purifying power obtained from the mixture of $Y$ parts of vegetable or animal oil plus $X$ parts of mineral oil.

It was discovered, however, that the mixture according to the present invention ($X$ parts of mineral oil and $Y$ parts of animal or vegetable oil) yielded an appreciably greater purifying power than the purifying powers obtained by combining $Y$ parts of vegetable or animal oil with $Z$ parts of vegetable or animal oil, or by combining $X$ parts of mineral oil with $W$ parts of mineral oil. In other words, the separate purifying powers of the mineral oil and the animal or vegetable oil unexpectedly are found to be super-additive when the two oils are mixed and used together.

To exemplify the nature of the super-additive effect which the mixture has according to the present invention, a series of experiments have been performed in which the mineral oil used was Vitrea 69 and the vegetable oil was soya bean oil as used in the foregoing example. The impure titanium tetrachloride contained 0.09% by weight of vanadium calculated as $V_2O_5$. The concentration of the oil mixture was 0.36% by weight calculated on the impure titanium tetrachloride. In each case, the impure titanium tetrachloride was refluxed with the oil mixture, as described in the example, until the vanadium no longer could be detected in the titanium tetrachloride vapor. The length of time required to reach this condition was noted in minutes and, as such, indicates the purifying power of the oil mixture. To exemplify the criticality of the proportions of each component oil in the oil mixture, according to the present invention, the relative proportions of the Vitrea 69 and soya bean oil were varied for each set of experiments.

The following tables set forth the results obtained:

*Table A (2 Parts Soya Bean and 98 Parts Vitrea 69)*

|  | Parts of Soya Bean Oil | Parts of Vitrea 69 | Purification time in minutes |
|---|---|---|---|
| (1) | 2 | 98 | 12.5 |
| (2) |  | 98 | 16.5 |
| (3) | 27.8 |  | 16.5 |
| (4) | 29.8 |  | 13.5 |

*Table B (5 Parts Soya Bean Oil and 95 Parts Vitrea 69)*

|  | Parts of Soya Bean Oil | Parts of Vitrea 69 | Purification time in minutes |
|---|---|---|---|
| (1) | 5 | 95 | 10.0 |
| (2) |  | 95 | 17.5 |
| (3) | 27 |  | 17.5 |
| (4) | 32 |  | 11.5 |

*Table C (10 Parts Soya Bean Oil and 90 Parts Vitrea 69)*

|  | Parts of Soya Bean Oil | Parts of Vitrea 69 | Purification time in minutes |
|---|---|---|---|
| (1) | 10 | 90 | 8.0 |
| (2) | 10 |  | 85.0 |
| (3) |  | 30.6 | 85.0 |
| (4) |  | 120.6 | 12.5 |

*Table D (15 Parts Soya Bean Oil and 85 Parts Vitrea 69)*

|  | Parts of Soya Bean Oil | Parts of Vitrea 69 | Purification time in minutes |
|---|---|---|---|
| (1) | 15 | 85 | 7.0 |
| (2) | 15 |  | 62.5 |
| (3) |  | 48.5 | 62.5 |
| (4) |  | 133.5 | 11.5 |

*Table E (20 Parts Soya Bean Oil and 80 Parts Vitrea 69)*

|  | Parts of Soya Bean Oil | Parts of Vitrea 69 | Purification time in minutes |
|---|---|---|---|
| (1) | 20 | 80 | 6.1 |
| (2) | 20 |  | 43.0 |
| (3) |  | 60 | 43.0 |
| (4) |  | 140 | 10.7 |

*Table F (40 Parts Soya Bean Oil and 60 Parts Vitrea 69)*

|  | Parts of Soya Bean Oil | Parts of Vitrea 69 | Purification time in minutes |
|---|---|---|---|
| (1) | 40 | 60 | 4.5 |
| (2) | 40 |  | 6.5 |
| (3) |  | 182 | 6.5 |
| (4) |  | 242 | 4.5 |

*Table G (1 Part Soya Bean Oil and 99 Parts Vitrea 69)*

|  | Parts of Soya Bean Oil | Parts of Vitrea 69 | Purification time in minutes |
|---|---|---|---|
| (1) | 1 | 99 | 13.7 |
| (2) |  | 99 | 16.2 |
| (3) | 28.3 |  | 16.2 |
| (4) | 29.3 |  | 13.8 |

From the foregoing Tables A–E, in which the soya bean oil is present in the amount of 2–20% calculated on the weight of the total mixture of Vitrea 69 and soya bean oil, it is clear that the effectiveness of the mixture (experiment No. 1 in each table) according to the present invention is unexpectedly super-additive.

In Table A, the purification time of the mixture (experiment No. 1) was found to be 12.5 minutes. When the amount of Vitrea 69 used in the mixture of experiment No. 1 was used alone to purify the titanium tetrachloride, the purification time was 16.5 minutes (experiment No. 2). It then was found that in order to purify the titanium tetrachloride to the same degree and in the same time as in experiment No. 2, the amount of soya bean oil when used alone had to be 27.8 parts (see experiment No. 3). Thus, it is clear that 98 parts of Vitrea 69 when used alone has the same purifying power as 27.8 parts of soya bean oil when used alone. In experiment No. 4 of Table A, the 27.8 parts of soya bean oil was substituted for the 98 parts of Vitrea 69 in the mixture of 2 parts soya bean oil and 98 parts of Vitrea 69. Thus, the mixture of experiment No. 4 consisted of 27.8 parts soya bean oil (having the equivalent purifying power of 98 parts Vitrea 69) plus 2 parts of soya bean oil or a total of 29.8 parts soya bean oil. The purification time for the 29.8 parts soya bean oil when used alone was found to be 13.5 minutes, one minute longer than the purification time required for the mixture of 2 parts soya bean oil and 98 parts Vitrea 69.

From the foregoing it is clear that the separate purification powers of the 2 parts of soya bean oil and the 98 parts of Vitrea 69 in the mixture of experiment No. 1 are not additive, but rather are super-additive since the replacement of the parts of Vitrea 69 with an amount of soya bean oil (27.8 parts) having an equivalent purifying power requires a longer time to attain the same degree of purification.

In Tables B–E, the same procedure was followed as described for Table A. In each case, the purification power of the mixture of soya bean oil and Vitrea 69 was ascertained. In Table B, the amount of Vitrea 69 which was used in the mixture of the two oils was then used alone and the purification time was noted to be 17.5 minutes. Then the amount of soya bean oil required to accomplish the same degree of purification as the Vitrea 69 was ascertained. In Table B, this amount of soya bean oil was found to be 27 parts. The 27 parts of soya bean oil then was substituted for the 95 parts of Vitrea 69 in the oil mixture of experiment No. 1 to make a total of 5 parts plus 27 parts of soya bean oil or 32 parts soya bean. For 32 parts of soya bean oil it was found that the purification time was 11.5 minutes, 1½ minutes longer than the purification time of the oil mixture of soya bean oil and Vitrea 69.

In Tables C, D and E, the soya bean oil of the original mixture was replaced instead of the Vitrea 69. In each case it was found, upon replacing the soya bean oil in the oil mixture with an amount of Vitrea 69 having the same purifying power, that a longer time was required to purify the titanium tetrachloride to the same degree. In Tables C and D the difference in purification time was found to be 4½ minutes. In Table E the time difference was 4.6 minutes.

Consequently it is clear that when the amount of the more readily carbonizable oil in the mixture is maintained with the range of 2–20% calculated on the weight of the total mixture of purifying oils, the separate purifying powers of the slowly carbonizable oil (mineral oil) and the more readily carbonizable oils (vegetable or animal oils such as soya bean oil) are not additive but rather are super-additive. When a greater amount of animal or vegetable oil having an iodine value of at least 80, such as 40% in Table F, is used, no super-additive effect in any appreciable consequence is produced. From the experiments in Table F, it is apparent that the separate purifying powers of the soya bean oil and the Vitrea 69 are substantially additive since the replacement of the soya bean oil in the mixture of soya bean oil and Vitrea 69 with an amount of Vitrea 69 having an equivalent purifying power does not change the time required to attain the same degree of purification.

Similarly, in Table G, when the proportion of soya bean oil in the mixture of soya bean oil and Vitrea 69 is reduced below 2%, the separate purifying powers of the soya bean oil and the Vitrea 69 no longer are super-additive but merely are additive since either oil may be replaced with an oil having an equivalent purifying power without any noticeable and significant change in the time required for purification.

Thus, it will be appreciated that in order to attain a super-additive effect of the mixture of oils according to the present invention, it is essential to maintain the proportion of the more readily carbonizable oil (i.e. the animal or vegetable oil having an iodine value of at least 80) substantially within the range of 2–20% calculated on the weight of the mixture. By limiting the proportion of the more readily carbonizable oil to 2–20% it will be appreciated that the slowly carbonizable oil (i.e. the mineral oil having an iodine value not exceeding 25) is limited to 80–98% since the mixture contains only two oils.

Referring now to the drawing, the graph shown therein plots refluxing time against the concentration of the purifying agent in terms of percent calculated on weight of the mixture of the impure titanium tetrachloride. The points for the various curves illustrated in the drawing were taken from the experiments in Tables A–E. The reference numeral 10 designates a curve for a purifying agent containing 100% Vitrea 69 which is, as hereinbefore explained, a mineral oil having an iodine value not exceeding 25. Curve 12 represents a purifying agent containing 2% soya bean oil and 98% Vitrea 69. Curve 14 represents a purifying agent containing 5% soya bean oil and 95% Vitrea 69. Curve 16 represents a purifying agent containing 10% soya bean oil and 90% Vitrea 69 and curve 18 represents a purifying agent containing 100% soya bean oil. From each of these curves, it is apparent that no linear relationship exists between the purifying powers of the oils since none of the curves are straight lines. To the contrary the slope of each of the curves constantly changes until a range is reached where the increase of the concentration has substantially no improvement on the purifying power. This upper limit at which further increases in the purifying agent has no significant effect was found to be 1.0 percent. Thus, it is apparent that the useful range of the concentration lies substantially between 0.2 percent and 1.0 percent. Within this range, disproportionate increases in the purifying power are unexpectedly attained for each incremental and uniform increase in the concentration of the purifying agent.

The appreciable improvement in purification by mixing a slowly carbonizable oil with a readily carbonizable oil is shown by curves 12, 14 and 16. In considering the super-additive effect of the oil mixture according to Table B, for example, the mixture in experiment No. 1 corresponds to curve 14. When the Vitrea 69 in the oil mixture is replaced with 27 parts of soya bean oil having an equivalent purifying power, then the total purifying power of the original 5 parts of soya bean oil and the additional 27 parts of soya bean oil falls along a line extending between curve 10 and curve 14.

With regard to the super-additive effect of the oil mixture according to the present invention and also to the concentration range of the mixture in the titanium tetrachloride, the results obtained with the soya bean oil are essentially the same for the other mineral, animal and vegetable oils hereinbefore mentioned. Thus, it will be appreciated that replacement of the soya bean oil with other oils such as linseed oil, cottonseed oil or castor oil yield the same results and, consequently, it would amount to mere repetition to set forth further examples and experiments involving these other oils.

Thus, it will be appreciated that purifying mixture according to the present invention provides for a super-additive increase in purifying power over the purifying power of a purifying agent containing 100% of an oil with an iodine value not exceeding 25. Furthermore, there is substantially no discoloration of the purified titanium product even though oils such as cottonseed oil and soya bean oil are employed.

The invention may be embodied in other specific forms without depating from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process for the purification of titanium tetrachloride containing as an impurity at least one of the metals vanadium, chromium, and iron, which comprises heating the impure titanium tetrachloride with 0.2 to 1.0 percent calculated on the weight of the impure titanium tetrachloride of a mixture which consists essentially of a mineral oil having an iodine value not exceeding 25 and an organic material selected from the group consisting of vegetable and animal oils having an iodine value of at least 80, the latter organic material being present in a quantity amounting to 2 to 20 percent calculated on the weight of the mixture thereof with the mineral oil, the impure titanium tetrachloride being heated at a temperature of at least 100° C., and separating the purified titanium tetrachloride from the solid carbonization products.

2. The process recited in claim 1, wherein the said impure titanium tetrachloride is heated in the liquid state under atmospheric pressure at a temperature within the range of 100° C. to 136° C.

3. The process recited in claim 1, wherein the iodine value of the said organic material having an iodine value of at least 80 does not exceed 230.

4. The process recited in claim 3, wherein the said organic material is soya bean oil.

5. The process recited in claim 3, wherein the said organic material is linseed oil.

6. The process recited in claim 3, wherein the said organic material is cottonseed oil.

7. The process recited in claim 3, wherein the said organic material is castor oil.

References Cited in the file of this patent

UNITED STATES PATENTS 2,592,021    Frey et al. _____ Apr. 8, 1952

FOREIGN PATENTS 743,735    Great Britain _____ Jan. 25, 1956
744,074    Great Britain _____ Feb. 1, 1956

OTHER REFERENCES

Lewkowitsch, "Chemical Technology of Oils, Fats, and Waxes," 3rd edition (1904), vol. 1, pages 244 and 250; vol. 2, pages 529 and 530, MacMillan Co., New York.

Lange, "Handbook of Chemistry," pages 756–59, 9th edition (1956), Handbook Publishers, Inc., Sandusky, Ohio.